Aug. 23, 1960 G. A. LYON 2,950,142
WHEEL BALANCING WEIGHT ASSEMBLY
Filed July 22, 1955
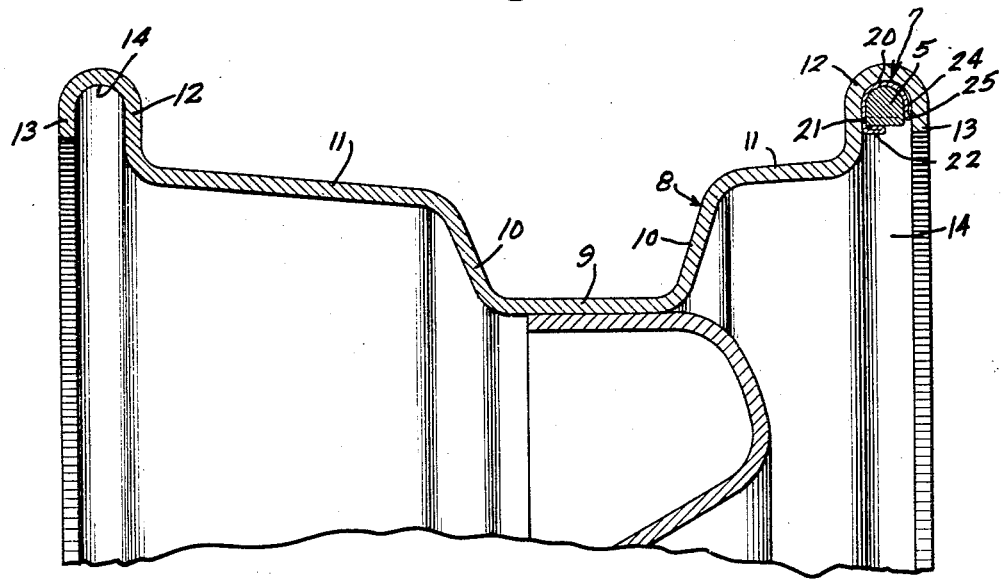
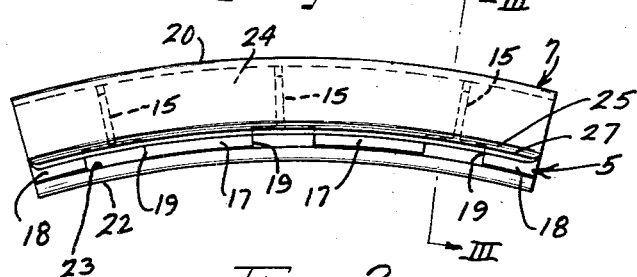
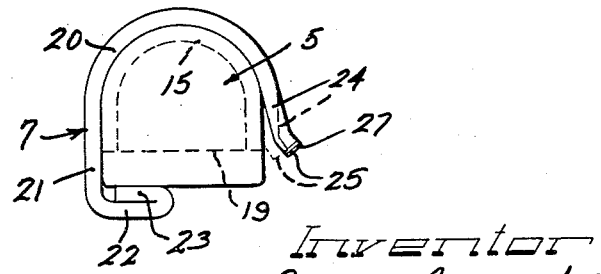
Inventor
GEORGE ALBERT LYON
by Hill, Sherman, Meroni, Gross & Simpson Attys.

United States Patent Office 2,950,142
Patented Aug. 23, 1960

2,950,142

WHEEL BALANCING WEIGHT ASSEMBLY

George Albert Lyon, 13881 W. Chicago Blvd.,
Detroit 28, Mich.

Filed July 22, 1955, Ser. No. 523,734

9 Claims. (Cl. 301—5)

The present invention relates to improvements in wheel structures, and more particularly concerns automobile wheels and novel means for balancing such wheels.

It is, of course, a well known fact that due to many variables in manufacture, assembly, and service conditions automotive wheels, and more particularly automobile wheels often are found to be out of balance either in a static or dynamic sense, or both. In probably the most popular practice for remedying such imbalance, it has been customary to apply wheel balancing weights, generally made of lead, of appropriate mass, as necessitated, and where required on the terminal flange of the tire rim of a wheel in order to bring the wheel back into balance. It is highly important that such balance be maintained with as nearly as practicable perfection in order to attain uniformity in tire wear and to avoid vibrations in the running gear of the vehicle with which the wheel is associated.

One of the disadvantages heretofore in applying wheel balancing weights to the terminal flanges of vehicle wheel tire rims has been the rather exposed location of the balancing weights. Not only are the weights, as commonly employed attached by means of clips engaged about the edge of the terminal flange and thus liable to dislodgement or at least shifting upon driving the wheel against a street curb or other object, but the weights are also generally exposed to view as a substantial eyesore on what is generally a fairly attractively finished wheel.

According to the present invention a wheel structure is provided with means for protectively mounting wheel balancing weights in a novel, highly efficient, concealed manner.

An important object of the present invention is to provide an improved wheel structure with concealed wheel balancing means.

Another object of the invention is to provide novel wheel balancing means for pneumatic tired automotive wheels.

A further object of the invention is to provide improved wheel balancing means.

Still another object of the invention is to provide novel wheel balancing means having self-retaining structure for engagement with a vehicle wheel.

It is a further object of the invention to provide novel wheel balancing weight engaging and retaining means.

Other objects, features and advantages of the present invention will be readily apparent from the following detailed description of a preferred embodiment thereof taken in conjunction with the accompanying drawing, in which:

Figure 1 is an outer side elevational view of a wheel balancing weight assembly embodying features of the invention;

Figure 2 is an enlarged end elevational view of the wheel balancing weight assembly; and Figure 3 is a fragmentary radial sectional view through a vehicle wheel structure and showing the balancing weight assembly of Fig. 1 applied thereto and in section as taken substantially along the line III—III of Fig. 1.

In the exemplary embodiment as shown in Figs. 1 and 2, a weight mass 5 of predetermined size is constructed and arranged to be supported and retained in service within and by a housing-like retainer 7. By preference the weight 5 is made from a low cost easily worked, high specific gravity material such as lead. On the other hand, the retainer 7 is preferably made from suitable sheet metal such as steel, brass, aluminum, suitably treated or finished, or inherently characterized to resist corrosion, and having a substantial inherent or acquired resilience.

In the form selected for illustration, the balancing weight assembly is of a form that is especially adapted for use with a multi-flange, drop-center rolled vehicle tire rim 8 (Fig. 3) adapted for supporting a tubeless tire or a tire and tube assembly, and provided with the usual base flange 9, inner and outer side flanges 10, inner and outer intermediate flanges 11, and inner and outer terminal flanges 12. In this instance the terminal flanges 12 are of a novel construction including in addition to the generally radially outwardly extending and axially turned portions thereof, respective extremity flange extensions 13 that project radially inwardly in substantially spaced relation to the inner radially extending portions of the terminal flanges, and preferably substantially parallel thereto to a substantial radially inward extent to define within the terminal flange a groove 14 of substantial depth and annularly opening radially inwardly. It is within the groove 14 that the balancing weight assembly is adapted to be mounted at the appropriate place selected, either in the axially inner or axially outer of the terminal flanges 12, as required for dynamic or static balance, and where the balance points are out of phase more than one of the weight assemblies of proper size may be used.

It will be observed that the inside of the terminal flange 12 in each instance, as represented by the groove 14 is arcuately shaped both transversely, that is in cross section, and circumferentially. Accordingly, the wheel balancing weight 5 and the holder 7 are constructed of complementary shape to fit snugly together and to be received snugly within the groove 14 into which mounted.

For standardization and in order to enable adaptation of the balancing weight means to a substantial range of weight requirements, the weight 5 and the holder 7 are preferably constructed and related in convenient weight unit multiples or subdivisions. For example, the weight 5, while it may be made in a predetermined or fixed weight size and different sizes provided for different requirements, is preferably constructed as a multiple unit one piece structure that may be subdivided into fractional portions or units. Thus, the weight 5 may comprise a standard maximum weight unit of three ounces subdivided by transverse peripheral scorings 15 into a pair of one ounce sections 17 and a pair of half ounce sections 18. For convenience the one ounce sections, that is the larger sections, may be contiguous at the central portion of the weight while the half ounce sections may be at the respective opposite ends of the weight for convenience in detaching the half ounce sections when the weight is used. Through this arrangement, it will be apparent that from a single one of the weights 5 any incremental weight relationship from one-half ounce to three ounces, by half-ounce differentials can be attained.

Manipulation of the weight 5 and breaking of the several sections apart when it is desired to have subdivided sections thereof is facilitated by the provision of transverse grooves 19 of substantial depth across the inner arcuate surface portion of the weight, preferably symmetrically aligned with the scorings 15. This inner face is, as best seen in Figs. 2 and 3, preferably substantially straight across but on a radius complementary to the radius of the circumferential curvature of the tire rim, more particularly within the groove 14. The axially inner and outer side faces of the weight 5 are preferably substantially parallel and merge with a transversely domed or arcuate radially outer or crown surface generally complementary to the inside transverse curvature within the tire rim groove 14.

In cooperative relation to the weight unit subdivision of the weight 5, the holder 7 is preferably constructed to supply a weight unit subdivision such, for example as one-half ounce in total weight. With a thin light weight sheet material this can readily be calculated. If necessary due to the unit weight of the material in a piece the size required to provide the holder greater than the desired unit weight is found in the unaltered piece, appropriate apertures or weight relieving cutouts can be provided so as to bring the weight of the formed piece within the desired unit of weight. Thus, where for some reason a balancing weight of as little as one-half ounce is required, the housing 7 alone may be used as the balancing weight. However, if a one ounce balancing weight is required, a one-half ounce section 18 of the weight 5 may be detached therefrom and assembled with the holder 7 to make a combined weight of one ounce. Various other combinations up to three ounces may thus be provided, and when the weight 5 and the holder 7 are assembled in full, a three and one-half ounce total weight will be attained.

For supporting the weight 5 with a firm non-shiftable grip in service, but nevertheless enabling ready assembly or disassembly of the weight 5 relative to the holder 7, the holder 7 provides a housing into which the weight 5 can be easily slipped while the weight assembly is free from the wheel, but a positive substantially interlocked gripping relationship of the holder 7 upon the weight 5 automatically results as an incident to mounting the weight assembly within the selected one of the tire rim terminal flanges 12. To this end, the holder 7 is formed with a body 20 that is generally channel shaped and elongated to receive the weight 5 slidably longitudinally therein and enclose the weight within the chamber provided by the holder body. For this purpose, the holder body 20 is longitudinally arcuate complementary to the circumferential curvature of the tire rim terminal flange and to the arcuate crown of the weight 5. At one side the body 20 has a longitudinal and radial flange 21 which is arranged to lie alongside one of the axial faces of the weight 5. Propecting as an extension from the side wall flange 21 is a retainer flange 22 which is underturned to underlie the base or radially inner wall surface of the weight 5 for maintaining the weight within the channel of the holder body 20. Preferably the retainer flange 22 has a terminal flange portion 23 that is turned back upon itself for reinforcement and to provide a finished edge. Furthermore, the effective width of the retainer flange 22 is preferably only fractionally as great as the total width of the weight 5.

At the opposite side from the side flange 21, the holder body 20 is provided with a clamping and retainer flange 24. This flange is resilient and normally tends to spring into a diverging relation with respect to the side flange 21, substantially as shown in full outline in Fig. 2. In this sprung open relationship, a freely or easily longitudinally slidable relationship of the weight 5 to the chamber within the housing provided by the holder 7 prevails. Then by deflecting the side flange 24 toward the side flange 21 and into engagement with the weight 5, a firm clamping interengagement of the weight results for holding the weight against longitudinal displacement relative to the holder.

Herein the weigh holder 7 is self-retaining with respect to the tire rim. To this end, the weight retaining or clamping flange 24 is provided with a terminal turned generally radially inwardly and axially projecting terminal flange extension 25 that is short or narrow and stiff relative to the remainder of the flange 24 and provides an outer biting terminal edge 27. The construction and relationship is such that when the holder 7 is pressed radially outwardly into the groove 14, the side wall flange 21 engages slidably with one of the side walls defining the groove 14 while the opposite flexible retaining and clamping flange 24 engages the opposite side wall of the groove and is flexed toward and into clamping engagement with the weight 5. At the same time the turned stiff terminal flange extension 25, and more particularly the biting edge 27 thereof engages in biting gripping retaining relation against the opposing surface of the terminal flange wall. This relationship is shown in Fig. 3 wherein, although the weight assembly is shown as having the resilient retaining flange 24 in engagement with the outer flange extension 13, it will be appreciated that the assembly could be reversed so that the retaining flange 24 would engage the inner flange portion of the terminal flange 12. However, there is an advantage in having the flange portion 24 at the outer side of the assembly so that more ready access can be had to the recesses 19 for reception of a pry-off tool such as a screw driver to engage behind the weight retaining flange 22 for prying the weight assembly free from the groove or channel or annular socket 14 of the tire rim when desired. Leverage for such pry-out of the weight assembly is gained by fulcruming the pry-off tool against the edge of the flange 13. Of course, if the weight assembly is turned around the other way, that is with the flange 24 to the inside, a pry-off tool would have to be levered against the shoulder at junction between the intermediate flange 11 and the terminal flange 12 of the tire rim.

Due to the snug tight frictional and biting engagement effected by the housing 7 within the terminal flange groove 14, the weight assembly is held fixedly in place at the desired point circumferentially of the tire rim, either at the axially inner or axially outer side of the rim, depending on the type and point of balancing required. Oftentimes two or more of the weight assemblies may be necessary, depending upon the extent and severity of the imbalance that may be found on testing a wheel for balance.

It will be understood that modifications and variations may be effected without departing from the scope of the novel concepts of the present invention.

I claim as my invention:

1. In a wheel structure including a tire rim having a radially inwardly opening groove therein defined by opposed wall surfaces and with a flange portion at the outer side of said groove substantially concealing the groove, a wheel balancing weight assembly disposed within and concealed inside said groove from the outer side of the wheel by said flange, said weight including a weight portion of high specific gravity and a holder therefor inside of the groove and entirely inwardly relative to said rim flange portion and having means retainingly interengaged with one of said wall surfaces defining said groove, said holder comprising a resilient clamping structure including said retaining means and a portion thrusting against the other of said wall surfaces defining the groove and maintained under clamping engagement with said weight portion and against unintentional displacement from the groove by said engagement of said retaining means with said one groove wall surface.

2. In a wheel structure including a tire rim having a generally radially inwardly opening annular groove of substantial depth and width, a wheel balancing weight member and a retainer therefor engageable as an assembly within said groove and having a resilient retaining flange gripping a surface within said groove spaced from the weight member under resilient gripping tension and being thereby grippingly pressed against a surface of the weight opposing said groove surface.

3. In a wheel structure including a tire rim with a terminal flange having a turned back extremity flange extension defining with the remainder of the terminal flange a generally radially inwardly opening annular groove of substantial depth and defined by opposed walls, a wheel balancing weight assembly engageable within said groove and including a weight portion of high specific gravity spaced from the walls defining the groove and a holder of sheet material engaging the weight portion in the space between the weight portion and said walls defining the groove and including resilient gripping means having the weight portion therebetween and engageable with the walls defining the groove and placed thereby under resilient gripping clamping engagement with the weight portion.

4. In a wheel balancing weight structure for use with vehicle wheels, a resilient sheet metal member including a channel shaped body having opposite wall flanges one of which has an inturned retaining flange terminal and the other of which wall flanges has a turned terminal retaining gripping lip flange extension turned outwardly for retaining gripping engagement with a wall surface of a wheel groove into which the member may be mounted in service, and a high specific gravity weight element mounted within the channel and held therein by the inturned flange terminal and adapted to be gripped firmly upon deflection of the wall flange having the retaining terminal lip flange toward the opposite wall flange as an incident to mounting of the assembly within a wheel groove.

5. In a wheel balancing weight assembly, a sheet metal holder of generally channel shape providing a chamber therein defined at one side by a wall flange having an underturned retaining flange narrower than the width of the chamber and defined at the opposite side by a flexible clamping flange, a weight member of high specific gravity interengageable in said chamber and having a recess which opens toward and is partially closed by said retaining flange and is exposed beyond the end of said retaining flange for entry of a pry-off tool thereinto and behind said underturned retaining flange.

6. In a wheel balancing weight and holder assembly constructed and arranged to be assembled within a groove chamber of a tire rim, a holder of resilient sheet metal having a cross sectional shape generally complementary with the tire rim groove into which it is to be mounted and provided with opposed resiliently flexibly related side wall flanges one of which has an inturned terminal portion providing a retainer facing into a chamber provided within the holder and the opposite flange having a biting terminal extremity directed generally outwardly away from said inturned terminal for effecting biting retaining engagement with the surface of the groove within which mounted, and a wheel balancing weight member of generally complementary cross sectional shape and engageable within the chamber provided by said holder by longitudinal relative assembly movement from one end of the holder and retained within the holder against transverse displacement from the chamber by said inturned terminal and arranged to be gripped against longitudinal displacement by relative flexure of said holder flanges toward one another upon mounting of the assembly within the tire rim groove and biting interengagement of said biting terminal with the groove surface.

7. In a wheel structure including a tire rim having a terminal flange turned to provide a radially inwardly opening groove with axially inner and outer spaced flange portions one of which affords a free edge, a wheel balancing weight assembly within said groove including a weight member, and a separable holder therefor including means for retainingly interengaging with a surface within said groove, said holder having a pry-off shoulder portion located on the portion thereof adjacent to the axially inner terminal flange portion of the rim and opposite to said free edge and accessible at the radially inner open side of the terminal flange groove so as to be engageable by a pry-off tool levered against said free edge for dislodging the assembly from within said groove.

8. In a wheel structure including a tire rim having a terminal flange including a radially inwardly opening groove defined by spaced generally radially extending flange portions, a wheel balancing weight assembly arranged for self retaining engagement within said groove and including a resilient holder having a body generally complementary to and nestingly engageable within said groove providing a chamber within said body for a wheel balancing weight, said holder body having spaced apart flanges arranged to oppose engageably the respective terminal flange portions at axially opposite sides of the groove, one of said flanges having a biting turned terminal extremity directed generally radially inwardly and axially toward and thus bitingly, retainingly, engageable with the opposed terminal flange portion, and the remaining holder flange having an angularly turned terminal portion directed generally toward said biting terminal and providing a retaining flange for retaining the weight against radially inward displacement from within the chamber provided by the holder.

9. In a wheel balancing weight structure, a weight holder of substantially channel shape adapted to be inserted into and having means thereon for securing it removably within a radially inwardly opening groove of a tire rim terminal flange, the holder defining therein a weight-receiving channel arranged to open radially inwardly when the holder is in the rim groove and having a wall provided with a retaining flange projecting at least partially across the open side of said channel within the holder, an elongated weight member within the channel of the holder and having a plurality of transverse circumferential scorings for subdivision of the weight member into a plurality of predetermined weight units, and recesses of substantial depth and substantially wider than said scorings aligned with said scorings and disposed transversely across and in one face of the weight member and opposing said flange of the holder to afford pry-off tool access recesses.

References Cited in the file of this patent

UNITED STATES PATENTS

| | | |
|---|---|---|
| 1,620,871 | Carrey | Mar. 15, 1927 |
| 2,185,017 | Purvis | Dec. 26, 1939 |
| 2,216,219 | Wiley | Oct. 1, 1940 |
| 2,370,361 | Le Jeune | Feb. 27, 1945 |
| 2,459,568 | Lyon | Jan. 18, 1949 |
| 2,485,936 | Stroberg | Oct. 25, 1949 |
| 2,640,727 | Kennedy | June 2, 1953 |

FOREIGN PATENTS

| | | |
|---|---|---|
| 627,995 | France | June 20, 1927 |